Nov. 17, 1925.

F. O. JAQUES, JR 1,562,332

THICKNESS GAUGE OR FEELER

Filed Oct. 2, 1922

INVENTOR:
Fernando Oscar Jaques, Jr.,
by Chas. W. Luther
ATTORNEY.

Patented Nov. 17, 1925.

1,562,332

UNITED STATES PATENT OFFICE.

FERNANDO OSCAR JAQUES, JR., OF PROVIDENCE, RHODE ISLAND, ASSIGNOR OF ONE-HALF TO THE CENTRAL TOOL COMPANY, OF CRANSTON, RHODE ISLAND, A CORPORATION OF RHODE ISLAND.

THICKNESS GAUGE OR FEELER.

Application filed October 2, 1922. Serial No. 591,935.

*To all whom it may concern:*

Be it known that I, FERNANDO OSCAR JAQUES, Jr., a citizen of the United States, residing at Providence, in the county of Providence and State of Rhode Island, have invented a new and useful Improvement in Thickness Gauges or Feelers, of which the following is a specification.

My invention has reference to an improvement in gauges and more particularly to an improvement in thickness gauges or feelers for use in gauging spark plugs, tappets, etc., of gas engines of automobiles.

Such gauges or feelers are usually in the form of small pieces of sheet metal each of the required thickness, they are easily mislaid or lost and are not usually in a convenient place when required for use.

The object of my invention is to improve the construction of such gauges or feelers, including a relatively fixed holder, whereby a set of such gauges or feelers are always in a relatively fixed and convenient position for use, preferably under the engine hood of automobiles.

My invention consists in the peculiar and novel construction of a thickness gauge or feeler, including a holder for holding a set of said gauges or feelers in a relatively fixed position adjacent a gas engine, said thickness gauge or feeler having details of construction as will be more fully set forth hereinafter and claimed.

Figure 1:
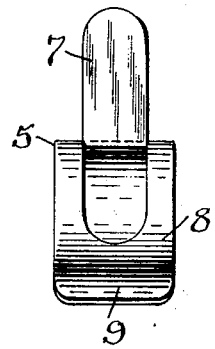
Figure 1 is a side view of my improved thickness gauge or feeler.
Figure 2:
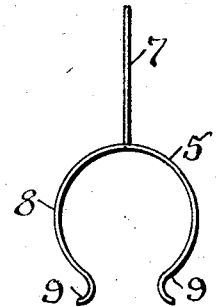
Figure 2 is an edge view of the same.

In the drawing, 5 indicates a thickness gauge or feeler and 6 a relatively fixed holder for holding a set of the gauges or feelers.

Figure 3:
Figure 3 is a face view of the sheet metal blank from which the gauge or feeler is formed.
Figure 4:
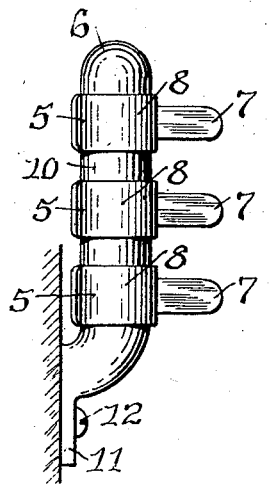
Figure 4 is a side view in elevation of a relatively fixed holder detachably holding a set of my improved thickness gauges or feelers.

The thickness gauge or feeler 5 is formed from a sheet metal blank, as shown in Figure 3 and shaped to have an elongated flat blade 7 of the required thickness and which forms the gauge or feeler on one end of which is a horse-shoe shaped spring clip 8 having curved spring arms 9, 9, all formed integral of sheet metal, of the required thickness. In a set of thickness gauges or feelers each blade 7 is of a different thickness, corresponding to the work required, as for instance, one could be one thirty second of an inch in thickness, another ten one thousandths of an inch in thickness and so on.

The holder 6 is in the form of a round elongated body 10, on which the gauges or feelers 5, 5, are detachably secured, said body 10 having a flattened end 11 in which is a screw-hole for a screw 12 by which the holder is secured, in a relatively fixed position, to any convenient part of an automobile, preferably under the hood, adjacent the engine.

When in position for use, the gauges or feelers 5, 5, are detachably secured to the holder 6 each by its spring clip 8, thereby keeping the set of gauges or feelers together and being held in a relatively fixed position, adjacent the engine, as described, they are always in a convenient position for use. After use they are easily and quickly replaced on the holder for future use.

Having thus described my invention I claim as new:—

As a new article of manufacture, a thickness gauge or feeler for gas engines comprising a holder member 6 having a round elongated body 10 on which is a flattened end 11, means for securing the flattened end 11 to a relatively fixed object, a thickness gauge or feeler 5, having an elongated flat blade 7 of the required thickness and which forms the thickness gauge or feeler part and on one end of which is a horse-shoe shaped spring clip 8 to be mounted on the holder member 6, the blade 7 having the required thickness, for the purpose as described.

In testimony whereof, I have signed my name to this specification.

FERNANDO OSCAR JAQUES, JR.